United States Patent
Morimoto et al.

(10) Patent No.: US 7,574,298 B2
(45) Date of Patent: Aug. 11, 2009

(54) FUEL INJECTION CONTROLLER

(75) Inventors: Youhei Morimoto, Kariya (JP); Hiroshi Haraguchi, Kariya (JP); Akikazu Kojima, Gamagori (JP)

(73) Assignee: Denso Corporation, Kariya (JP)

( * ) Notice: Subject to any disclaimer, the term of this patent is extended or adjusted under 35 U.S.C. 154(b) by 14 days.

(21) Appl. No.: 11/902,870

(22) Filed: Sep. 26, 2007

(65) Prior Publication Data
US 2008/0183368 A1 Jul. 31, 2008

(30) Foreign Application Priority Data
Sep. 29, 2006 (JP) ............................ 2006-267898

(51) Int. Cl.
*F01N 3/08* (2006.01)
*F02D 41/30* (2006.01)

(52) U.S. Cl. .................. 701/104; 701/108; 123/568.12

(58) Field of Classification Search ................. 701/104, 701/102, 101, 108, 109; 123/568.12, 568.16, 123/568.21; 60/274, 276, 285
See application file for complete search history.

(56) References Cited

U.S. PATENT DOCUMENTS

| 5,621,167 | A | * | 4/1997 | Fang-Cheng | ............. | 73/114.74 |
| 6,085,732 | A | * | 7/2000 | Wang et al. | .................. | 701/108 |
| 6,227,163 | B1 | | 5/2001 | Enoki et al. | | |
| 7,128,035 | B2 | * | 10/2006 | Lancaster et al. | ...... | 123/179.18 |
| 2006/0011180 | A1 | | 1/2006 | Sasaki et al. | | |

FOREIGN PATENT DOCUMENTS

| DE | 199 39 050 | 3/2001 |
| JP | 6-108824 | 4/1994 |
| JP | 2003-322015 | 11/2003 |

OTHER PUBLICATIONS

Japanese Office Action dated Dec. 16, 2008 issued in corresponding Japanese Application No. 2006-267898, with English translation.
German Office Action dated Feb. 10, 2009, issued in corresponding German Application No. 10 2007 000 797.5-26, with English translation.

* cited by examiner

*Primary Examiner*—Hieu T Vo
(74) *Attorney, Agent, or Firm*—Nixon & Vanderhye, PC (57) ABSTRACT

A fuel injection controller of an internal combustion engine decreases a target intake quantity stepwise and increases an opening degree command value of an EGR valve stepwise when the controller switches control to rich combustion control. Accordingly, an intake quantity gradually decreases and an EGR quantity gradually increases, so an oxygen quantity flowing into a combustion chamber (cylinder inflow oxygen quantity) gradually decreases. The injection quantity is gradually increased in accordance with the gradual decrease of the oxygen quantity. Thus, the fuel injection controller can perform processing for making an air fuel ratio rich in order to discharge nitrogen oxides from an occlusion agent while appropriately inhibiting torque fluctuation.

12 Claims, 7 Drawing Sheets

FUEL INJECTION CONTROLLER

CROSS REFERENCE TO RELATED APPLICATION

This application is based on and incorporates herein by reference Japanese Patent Application No. 2006-267898 filed on Sep. 29, 2006.

BACKGROUND OF THE INVENTION

1. Field of the Invention

The present invention relates to a fuel injection controller of an internal combustion engine.

2. Description of Related Art

As a kind of a fuel injection controller performing fuel injection control by operating an injector of an internal combustion engine having an occlusion agent, which occludes nitrogen oxides (NOx) when an air fuel ratio of exhaust gas is lean and discharges the NOx when the air fuel ratio is rich, there is a proposed controller that makes an air fuel ratio of a gasoline engine rich temporarily when a quantity of NOx occluded in an occlusion agent becomes equal to or greater than a predetermined value to discharge the NOx from the occlusion agent and to perform reduction purification of the discharged NOx (for example, as described in JP-A-H06-108824). This controller performs retardation operation of ignition timing to inhibit torque fluctuation when the controller makes the air fuel ratio rich.

However, the degree of the retardation of the ignition timing is restricted from the viewpoint of maintaining a suitable combustion state of the gasoline engine. In the case of a diesel engine, retardation of injection timing may be performed to inhibit the torque fluctuation when the air fuel ratio is made rich. Also in this case, the degree of the retardation of the injection timing is restricted from the viewpoint of maintaining the suitable combustion state of the diesel engine. Since the combustion state of the diesel engine becomes unstable specifically during rich combustion, there is a possibility that misfire is caused by performing the retardation of the injection timing.

SUMMARY OF THE INVENTION

It is an object of the present invention to provide a fuel injection controller capable of performing processing for making an air fuel ratio rich in order to discharge nitrogen oxides from an occlusion agent while appropriately inhibiting torque fluctuation.

According to an aspect of the present invention, a fuel injection controller has a fresh air quantity decrease device that decreases a fresh air quantity taken into an intake system of an engine under a condition requiring discharge of nitrogen oxides from an occlusion agent and an injection quantity gradual increase device that gradually increases an injection quantity of an injector in accordance with gradual decrease of an oxygen quantity flowing into a combustion chamber of the engine when the fresh air quantity is decreased.

Even if processing for decreasing the fresh air quantity is performed, a response delay arises until the fresh air quantity flowing into the combustion chamber actually decreases. If the operation concerning the reduction of the fresh air quantity is performed, the oxygen quantity flowing into the combustion chamber gradually decreases. Therefore, if the injection quantity is increased in an instant at the same time as the operation concerning the reduction of the fresh air quantity, increase of the output torque resulting from the increase of the injection quantity can occur. For this point, the above-described scheme gradually increases the quantity of the injected fuel in accordance with the gradual decrease of the oxygen quantity flowing into the combustion chamber. Accordingly, the increase of the fuel quantity when there is temporary a sufficient oxygen quantity can be suitably avoided. Thus, the fuel quantity that substantially does not increase the torque with the gradually decreasing oxygen quantity of each time can be injected.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
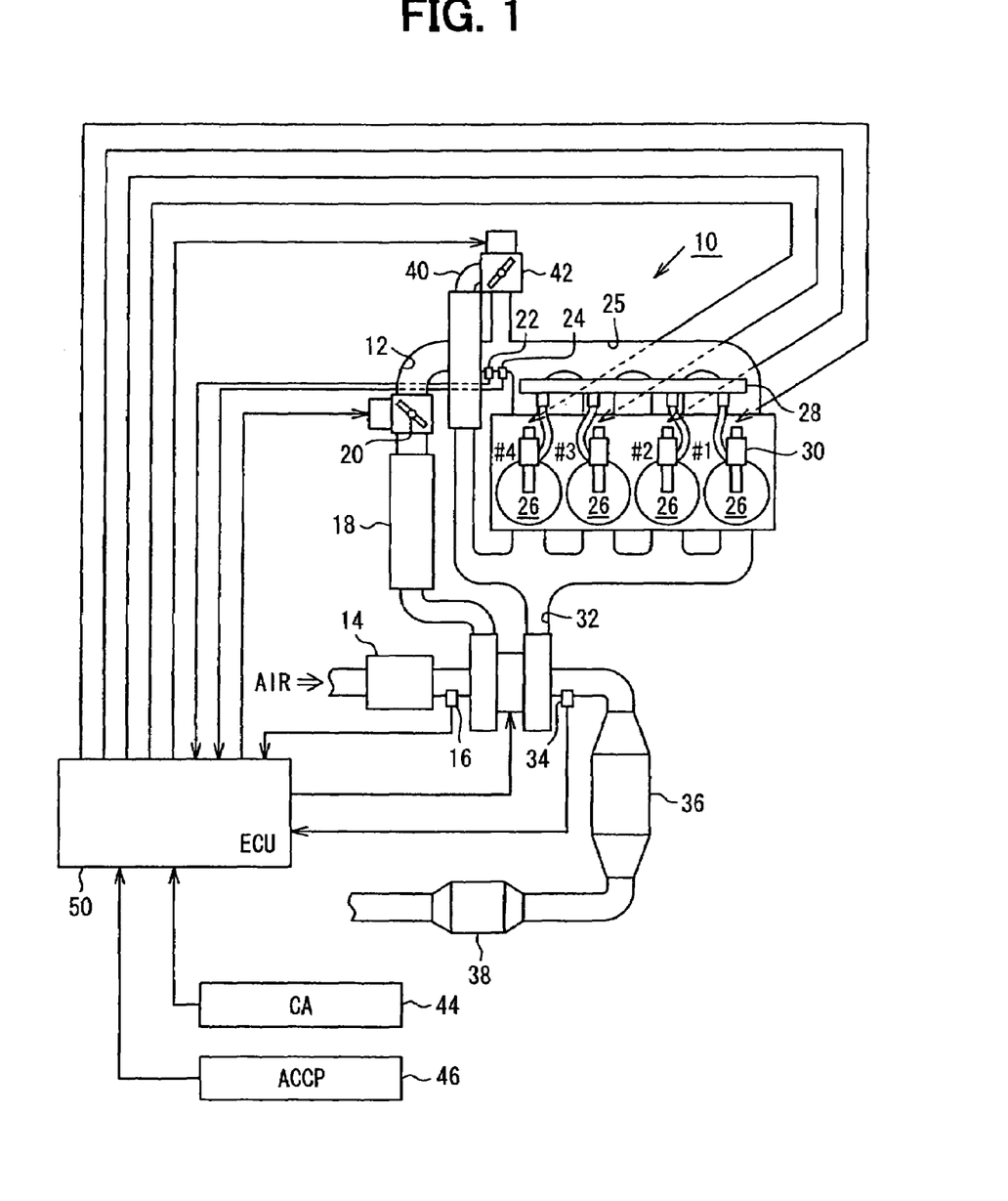
FIG. 1 is a schematic diagram showing an engine system according to a first embodiment of the present invention.

Now, a fuel injection controller for an internal combustion engine according to a first embodiment of the present invention applied to a fuel injection controller of a vehicular diesel engine will be explained with reference to drawings. FIG. 1 is a schematic diagram showing an engine system according to the present embodiment.

As shown in FIG. 1, an air cleaner 14, an air flow meter 16, a cooler 18, a throttle valve 20 and the like are provided upstream of an intake passage 12 of the diesel engine 10. An intake temperature sensor 22 and an intake pressure sensor 24 are provided downstream of the throttle valve 20 in the intake passage 12. The intake passage 12 can communicate with combustion chambers 26 of respective cylinders (in the present embodiment, four cylinders of first cylinder #1 to fourth cylinder #4 are illustrated) through a manifold 25. High-pressure fuel accumulated in a common rail 28 is injected to the combustion chambers 26 through injectors 30. Thus, a mixture gas of the fuel and the air in the combustion chamber 26 is used in combustion to generate a rotating force of the diesel engine 10.

Exhaust gas as the air produced by the combustion is discharged to an exhaust passage 32. An oxygen concentration sensor 34 for sensing an oxygen concentration in the exhaust gas is provided in the exhaust passage 32. An oxidation catalyst 36 and a NOx occlusion reduction catalyst 38 for occluding and reducing nitrogen oxides (NOx) are provided in the exhaust passage 32.

An exhaust gas recirculation passage 40 (EGR passage) for connecting the intake passage 12 and the exhaust passage 32 is provided between the intake passage 12 and the exhaust passage 32. A flow passage area between the intake passage 12 and the EGR passage 40 can be adjusted with an EGR valve 42.

In addition to the above-described sensors, the engine system has sensors for sensing the operation state of the diesel engine 10 such as a crank angle sensor 44 for sensing a rotation angle (crank angle: CA) of a crankshaft of the diesel engine 10. The engine system has various sensors for sensing a demand of a user such as an accelerator sensor 46 for sensing an operation amount ACCP of an accelerator pedal.

An electronic control unit 50 (ECU) controls output characteristics (output torque, exhaust characteristic) of the diesel engine 10 by operating the various actuators such as the injectors 30 based on the sensing values of the various sensors sensing the operation state of the diesel engine 10 and the demand of the user.

Fundamentally, as the above-described output control, lean combustion control of performing combustion control with an excessive air quantity (oxygen quantity) flowing into the combustion chamber 26 is performed. The NOx discharged into the exhaust gas at this time is occluded by the NOx occlusion reduction catalyst 38. If the NOx quantity occluded in the NOx occlusion reduction catalyst 38 becomes equal to or greater than a predetermined value, rich combustion control is performed temporarily. Thus, the NOx occluded in the NOx occlusion reduction catalyst 38 is discharged and the reduction purification of the discharged NOx is performed with unburned fuel in the exhaust gas.

In detail, the rich combustion control is realized by increasing the fuel injection quantity and by reducing the air quantity (fresh air quantity) taken into the intake passage 12. The reduction of the fresh air quantity is realized by reducing operation of the opening degree of the throttle valve 20 and increasing operation of the opening degree of the EGR valve 42. Even if the reducing operation of the opening degree of the throttle valve 20 and the increasing operation of the opening degree of the EGR valve 42 are performed, a response delay occurs in the reduction of the quantity of the oxygen actually flowing into the combustion chamber 26. That is, even if the above-described operations are performed stepwise, the quantity of the oxygen flowing into the combustion chamber 26 decreases gradually. The operation for increasing the injection quantity can be performed quickly compared to the change of the quantity of the inflow oxygen. Therefore, on the occasion of the switching to the rich combustion control, the increase amount of the injection quantity becomes excessive compared to the reduction amount of the oxygen quantity, and there is a possibility that output torque is increased by the increase of the injection quantity.

Figure 2:
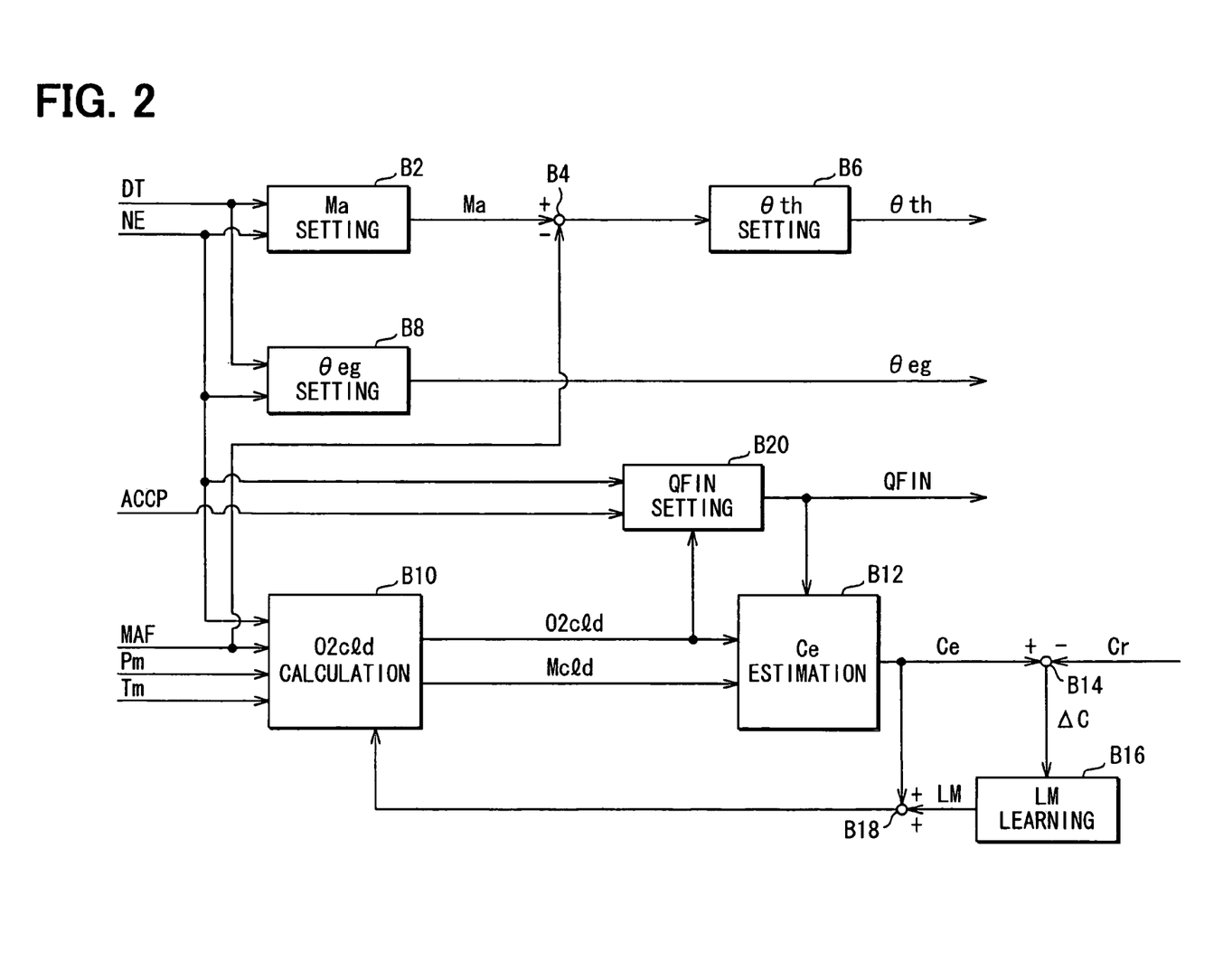
FIG. 2 is a block diagram showing rich combustion control processing according to the first embodiment.

Therefore, in the present embodiment, the injection quantity is increased gradually in accordance with the gradual decrease of the oxygen quantity flowing into the combustion chamber 26 to avoid the increase of the output torque. FIG. 2 is a block diagram showing the rich combustion control processing according to the present embodiment.

An intake quantity target value setting section B2 sets a target value of the air intake quantity (target intake quantity Ma) based on information about rotation speed NE and a load of the diesel engine 10. In the present embodiment, demand torque DT is used as the load. The demand torque DT may be decided by the operation amount ACCP of the accelerator and the rotation speed NE.

A deviation calculation section B4 calculates a difference $\Delta M$ between the air intake quantity MAF sensed by the air flow meter 16 and the target intake quantity Ma. A throttle opening degree setting section B6 sets the operation amount (opening degree $\theta$th of throttle valve 20) for performing feedback control for conforming the intake quantity MAF to the target intake quantity Ma based on the difference $\Delta M$. For example, the opening degree $\theta$th may be set in accordance with a proportional term and the like based on the difference $\Delta M$.

An EGR valve opening degree setting section B8 sets an opening degree $\theta$eg of the EGR valve 42 based on information about the rotation speed NE and the load of the diesel engine 10. In the present embodiment, the demand torque DT is used as the load.

An intake oxygen quantity estimation section B10 estimates the quantity of the oxygen in the intake air based on the operation state of the diesel engine 10 using a model of a flowing mode of the gas in the diesel engine 10. Parameters that are used in the estimation and are related to the operation state of the diesel engine 10 include a physical quantity about the intake air taken into the intake passage 12. In the present embodiment, an example of performing the estimation based on the intake quantity MAF sensed by the air flow meter 16, the intake temperature Tm sensed by the intake temperature sensor 22 and the intake pressure Pm sensed by the intake pressure sensor 24 is illustrated.

An exhaust oxygen concentration estimation section B12 calculates an estimation oxygen concentration Ce as an estimate of the oxygen concentration in the exhaust gas based on the operation state of the diesel engine 10 in accordance with a cylinder inflow oxygen quantity O2cld estimated by the intake oxygen quantity estimation section B10, a mass flow rate of the gas (cylinder inflow gas quantity Mcld) flowing into the combustion chamber 26 calculated on the occasion of the estimation of the cylinder inflow oxygen quantity O2cld, and a command value of the injection quantity (command injection quantity QFIN) outputted to the injector 30.

An error calculation section B14 calculates a difference $\Delta C$ between the oxygen concentration Cr sensed by the oxygen concentration sensor 34 and the estimation oxygen concentration Ce.

A model error learning section B16 learns a model error learning value LM based on the difference $\Delta C$ and corrects the estimation oxygen concentration Ce to compensate the model error. That is, an estimate correction section B18 calculates the sum of the model error learning value LM outputted by the model error learning section B16 and the estimation oxygen concentration Ce. The intake oxygen quantity estimation section B10 calculates the cylinder inflow oxygen quantity O2cld based on the output of the estimate correction section B18.

Figure 3:
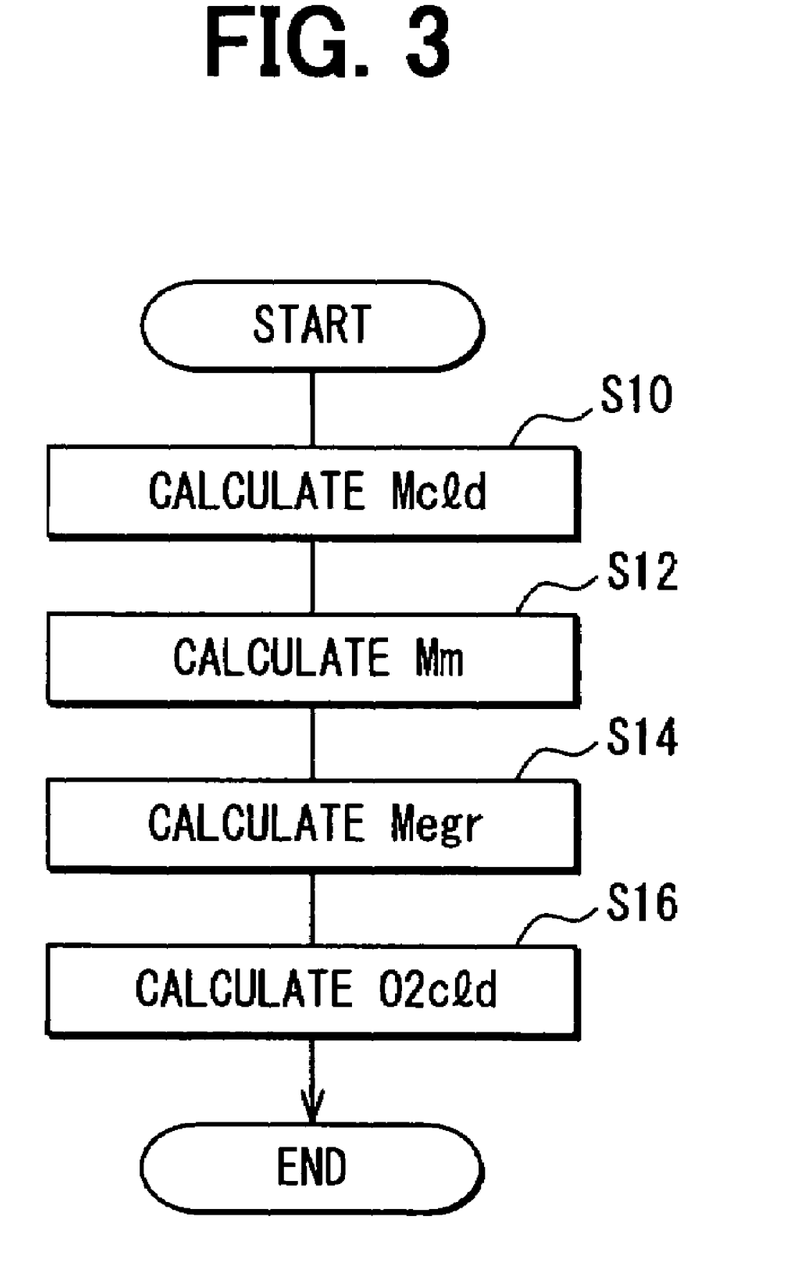
FIG. 3 is a flowchart showing a procedure of intake oxygen quantity estimation processing according to the first embodiment.

Next, the processing performed by the intake oxygen quantity estimation section B10 will be explained in detail with reference to FIG. 3. The ECU 50 repeatedly performs this processing in a predetermined cycle of time, for example. In a series of the processing, S10 calculates the cylinder inflow gas quantity Mcld. Here, map calculation of the volumetric efficiency is first performed in accordance with the intake pressure Pm and the rotation speed NE. Then, the cylinder inflow gas quantity Mcld is calculated based on the gas state equation using the intake temperature Tm, the intake pressure Pm and the volumetric efficiency.

Following S12 calculates a fresh air quantity Mm flowing into the manifold 25, for example, based on the rotation speed NE, the intake quantity MAF, the intake pressure Pm and the intake temperature Tm. Here, the fresh air quantity Mm is calculated as follows, for example. The intake pressure Pm is substituted for the pressure in a volume VIN of the intake passage 12 from the air flow meter 16 to the throttle valve 20. A change $\Delta P$ of the pressure in the volume VIN is calculated based on the intake pressure Pm. The fresh air quantity Mm flowing into the manifold 25 can be calculated with a following expression (1) using the law of mass conservation in the intake passage 12 in the time scale for calculating the change ΔP.

$$MAF-Mm=\Delta P \times VIN/(Tm \times R) \quad (1)$$

Following S14 calculates an exhaust flow rate (EGR quantity Megr) flowing into the manifold 25 through the EGR passage 40, for example, based on the change ΔP, the intake temperature Tm, the cylinder inflow gas quantity Mcld, the fresh air quantity Mm, and the volume Vm of the manifold 25. Here, the EGR quantity Megr is calculated by a following expression (2) based on the law of mass conservation in the manifold 25.

$$Mm+Megr-Mcld=\Delta P \times Vm/(Tm \times R) \quad (2)$$

Following S16 calculates an oxygen concentration of the gas flowing into the combustion chamber 26, for example, based on the EGR quantity Megr, the cylinder inflow gas quantity Mcld, the fresh air quantity Mm, the estimation oxygen concentration Ce and the like. Here, the estimation oxygen concentration Ce is used as an oxygen concentration of the EGR gas. Thus, the oxygen concentration provided after the fresh air joins the EGR gas can be calculated. The quantity of the oxygen flowing into the combustion chamber 26 (cylinder inflow oxygen quantity O2cld) can be calculated by multiplying the oxygen concentration by the cylinder inflow gas quantity Mcld. If the processing of S16 is completed, this series of the processing is ended once.

An injection quantity setting section B20 shown in FIG. 2 sets the command value of the injection quantity (command injection quantity QFIN) commanded to the injector 30 based on the operation amount ACCP of the accelerator, the rotation speed NE, and the cylinder inflow oxygen quantity O2cld.

Figure 4:
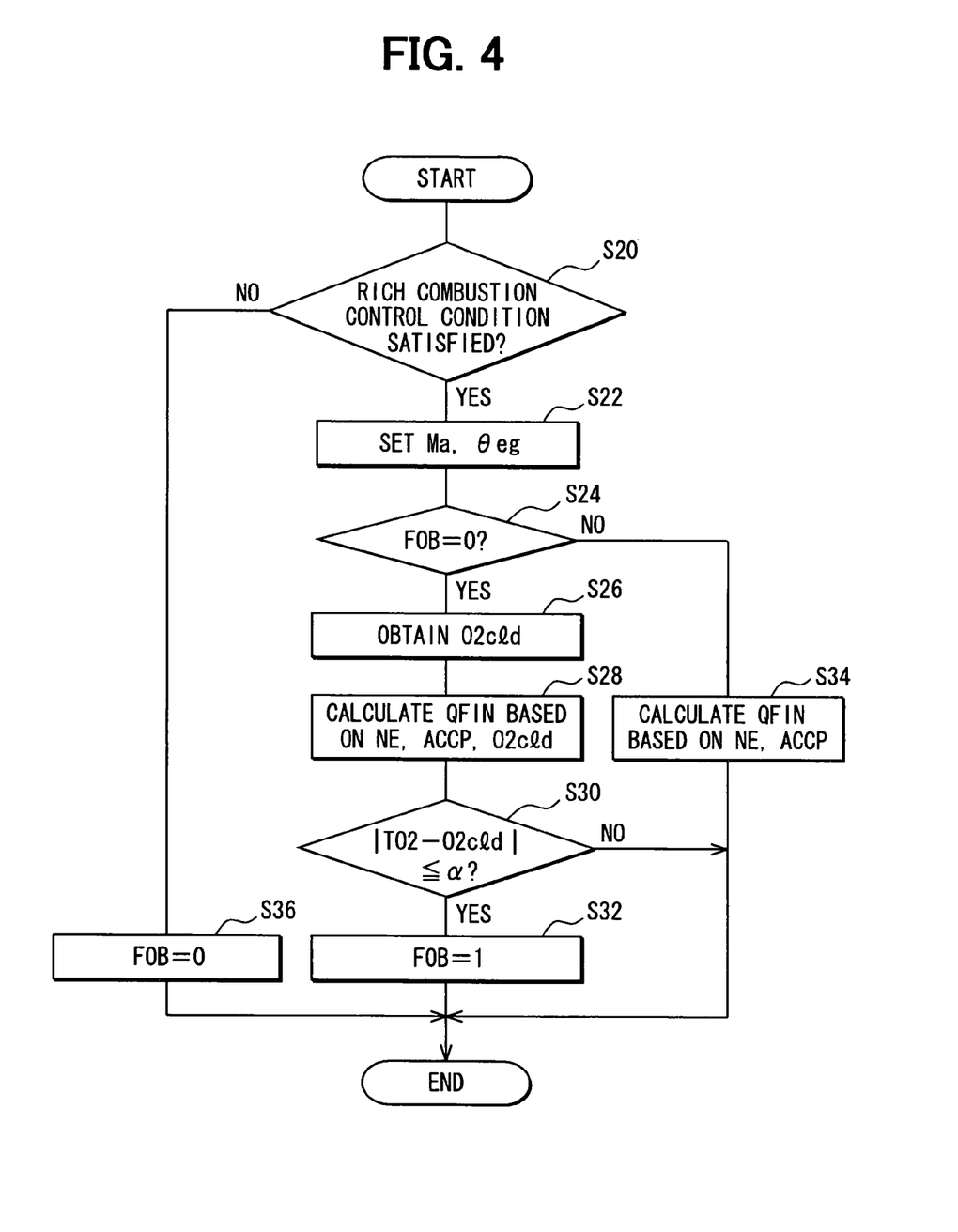
FIG. 4 is a flowchart showing a procedure of the rich combustion control processing according to the first embodiment.

FIG. 4 shows a procedure of the rich combustion control processing according to the present embodiment. The ECU 50 repeatedly performs this processing in a predetermined cycle of time, for example. In a series of the processing, S20 first determines whether a rich combustion control condition is satisfied. Here, the rich combustion control condition is satisfied if the NOx quantity occluded in the NOx occlusion reduction catalyst 38 becomes equal to or greater than a predetermined value and the diesel engine 10 is in a steady operation state. If it is determined that the rich combustion control condition is satisfied, the processing shifts to S22. S22 sets the target intake quantity Ma and the EGR valve opening degree θeg. Here, the target intake quantity Ma is reduced stepwise to a value decided by the demand torque DT and the rotation speed NE. The EGR valve opening degree θeg is increased stepwise to a value decided by the demand torque DT and the rotation speed NE.

Following S24 determines whether an oxygen quantity convergence flag FOB is zero. The oxygen quantity convergence flag FOB is a parameter that indicates whether the actual intake quantity MAF has converged to the target intake quantity Ma and the EGR quantity Megr has reached the steady state after the target intake quantity Ma and the EGR valve opening degree θeg are switched to the values for the rich combustion control. When the oxygen quantity convergence flag FOB is zero, it is determined that the convergence to the target intake quantity Ma and the shift to the steady state of the EGR quantity Megr have not been realized yet, and the processing shifts to S26. S26 obtains the cylinder inflow oxygen quantity O2cld calculated by S16 of FIG. 3.

Following S28 performs map calculation of the command injection quantity QFIN based on the rotation speed NE, the operation amount ACCP of the accelerator, and the cylinder inflow oxygen quantity O2cld. This processing gradually increases the command injection quantity QFIN in accordance with the gradual decrease of the cylinder inflow oxygen quantity O2cld due to the gradual decrease of the intake quantity MAF and the gradual increase of the EGR quantity Megr. In this processing, the rotation speed NE and the operation amount ACCP of the accelerator are referred to in order to further inhibit the fluctuation of the output torque. That is, since an oxygen utilization rate as a rate of the oxygen used for the combustion changes in accordance with the rotation speed NE during the rich combustion, the output torque cannot be decided uniquely based on the injection quantity. Therefore, the rotation speed NE is referred to in order to gradually increase the command injection quantity QFIN such that the fluctuation of the output torque is sufficiently inhibited. The accelerator operation amount ACCP is a parameter that defines the demand torque DT. Therefore, the command injection quantity QFIN can be decided while maintaining the presently demanded torque by referring to the operation amount ACCP of the accelerator.

Following S30 determines whether an absolute value of the difference between the cylinder inflow oxygen quantity O2cld and a target oxygen quantity TO2 is equal to or less than a predetermined value α. This processing determines whether the actual intake quantity MAF has converged to the target intake quantity Ma and the EGR quantity Megr has reached the steady state after the target intake quantity Ma and the EGR valve opening degree θeg are switched to the values for the rich combustion control. The target oxygen quantity TO2 is an oxygen quantity assumed to flow into the combustion chamber 26 when the actual intake quantity MAF converges to the target intake quantity Ma and the EGR quantity Megr reaches the steady state after the opening degree θeg is changed. The target oxygen quantity TO2 is calculated by map calculation in accordance with the demand torque DT and the rotation speed NE. The predetermined value α is set at a value that can exist as the absolute value of the difference between the cylinder inflow oxygen quantity O2cld and the target oxygen quantity TO2 when the actual intake quantity MAF converges to the target intake quantity Ma and the EGR quantity Megr reaches the steady state after the opening degree θeg is changed.

The processing shifts to S32 when it is determined that the absolute value is equal to or less than the predetermined value α at S30, that is, when it is determined that the actual intake quantity MAF has converged to the target intake quantity Ma and the EGR quantity Megr has reached the steady state after the opening degree θeg is changed. S32 sets the oxygen quantity convergence flag FOB at 1.

If S24 is NO, the processing shifts to S34. S34 performs map calculation of the command injection quantity QFIN based on the operation amount ACCP of the accelerator and the rotation speed NE. This processing is for deciding the command injection quantity QFIN as of the rich combustion control. Here, the command injection quantity QFIN is an injection quantity that can realize the demand torque DT decided from the operation amount ACCP of the accelerator and the like when the quantity of oxygen flowing into the combustion chamber 26 is equal to the target oxygen quantity TO2.

S36 sets the oxygen quantity convergence flag FOB at 0 if S20 is NO. The series of the processing is ended when S30 is no or when the processing at S32, S34 or S36 is completed.

Figure 5:
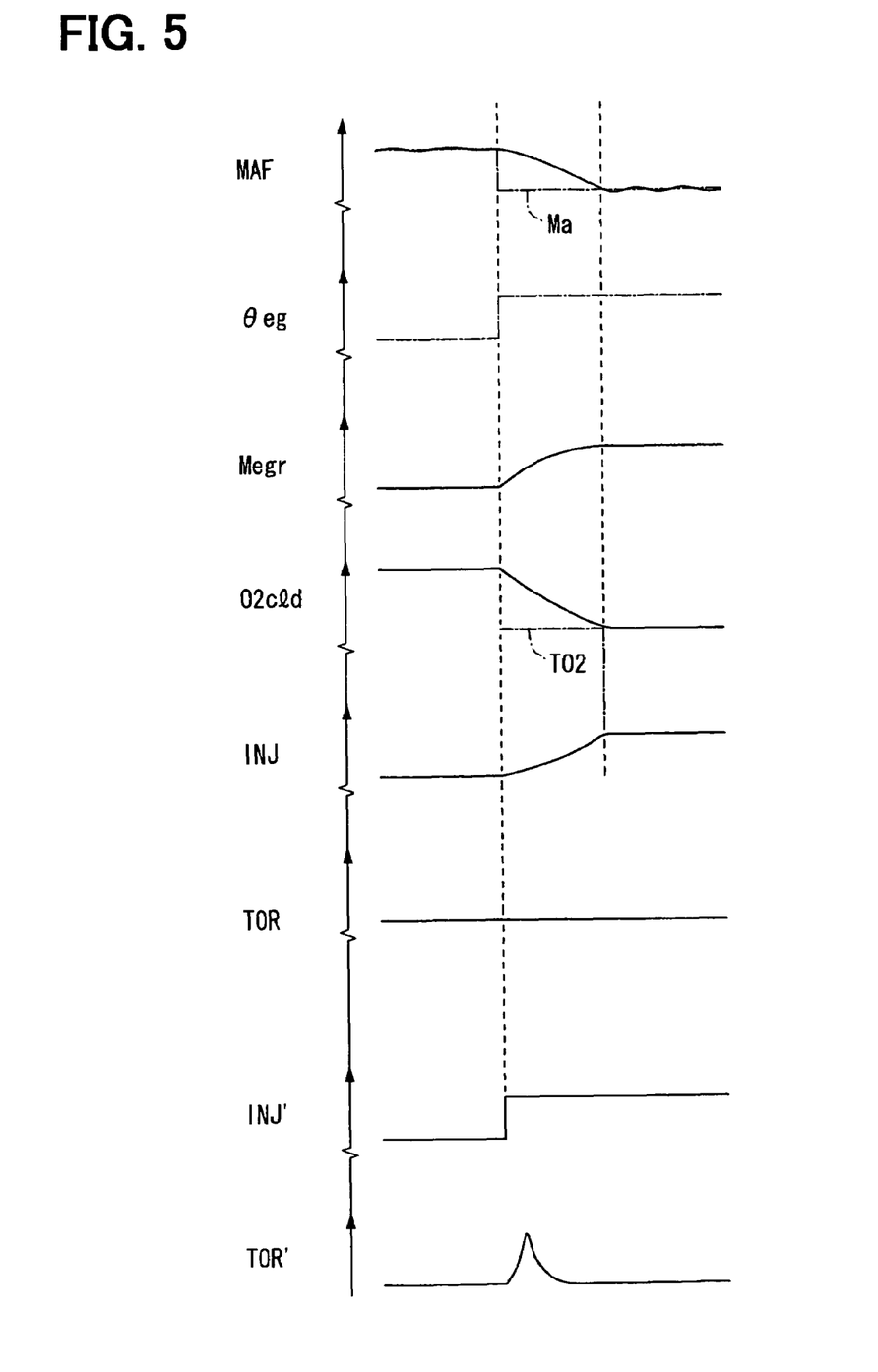
FIG. 5 is a time chart showing a mode of the rich combustion control according to the first embodiment.

FIG. 5 shows a mode of the rich combustion control. In detail, FIG. 5 shows a transition of the intake quantity MAF, a transition of the target intake quantity Ma, a transition of the command value of the EGR valve opening degree θeg, a transition of the EGR quantity Megr, a transition of the cylinder inflow oxygen quantity O2cld, a transition of the target oxygen quantity TO2, a transition of the injection quantity INJ, and a transition of the output torque TOR. As shown in FIG. 5, the injection quantity INJ is increased gradually in accordance with the gradual decrease of the cylinder inflow oxygen quantity O2cld, so the fluctuation of the torque TOR can be inhibited suitably when the control is switched to the rich combustion control. If the injection quantity is switched stepwise to the injection quantity of the time when the intake quantity and the EGR quantity become steady as shown by INJ' in FIG. 5 as in the conventional technology, the output torque increases temporarily as shown by TOR' in FIG. 5.

Thus, in the present embodiment, when the quantity of the oxygen flowing into the combustion chamber 26 is reduced by the operation of the throttle valve 20 and the EGR valve 42, the output torque fluctuation can be inhibited by gradually increasing the injection quantity in accordance with the gradual decrease of the oxygen quantity. Therefore, the setting mode of the target intake quantity Ma and the operation mode of the opening degree θeg of the EGR valve 42 can be defined freely. The period for performing the rich combustion control can be shortened as much as possible by changing the target intake quantity Ma and the opening degree θeg of the EGR valve 42 stepwise as in the present embodiment. These settings are quite effective to inhibit the instability of the combustion state in the diesel engine 10 as much as possible or to surely perform the reduction with the NOx occlusion reduction catalyst 38. That is, the combustion becomes unstable during the rich combustion control. Therefore, the rich combustion control period should be preferably shortened as much as possible. The reduction processing of the NOx occlusion reduction catalyst 38 is performed during a steady period. Therefore, if an increase of the output torque (i.e., acceleration requirement or the like) is demanded by the user through the operation of the accelerator, the reduction processing has to be suspended. For such the reasons, the rich combustion control period should be preferably shortened as much as possible.

In the present embodiment, the fuel injection control mode is set so that the gradual increase of the injection quantity is completed when the gradual decrease of the oxygen quantity is completed as shown in FIG. 5. Thus, the period until the air fuel ratio of the diesel engine 10 reaches the steady state in the rich combustion control (period until oxygen concentration sensor 34 reaches steady state) can be shortened as much as possible. Alternatively, the gradual increase of the injection quantity may be completed before the gradual decrease of the oxygen quantity is completed. The inventors of the present invention found that the fluctuation of the output torque can be suitably inhibited even in this case. Specifically in this case, the period until the air fuel ratio of the diesel engine 10 reaches the steady state in the rich combustion control can be substantially equalized to the period in the case where the injection quantity is increased stepwise as shown by INJ' in FIG. 5.

The present embodiment exerts following effects.

(1) Under the condition requiring the discharge of the NOx from the NOx occlusion reduction catalyst 38, the operation for reducing the fresh air quantity taken into the diesel engine 10 (oxygen quantity flowing into combustion chamber 26) is performed and the injected fuel quantity is increased gradually in accordance with the gradual decrease of the oxygen quantity accompanying the operation. Thus, the fuel quantity that substantially does not increase the torque with the gradually decreasing oxygen quantity of each time can be injected.

(2) The gradual increase of the injection quantity is completed within the period in which the quantity of the oxygen flowing into the combustion chamber 26 of the diesel engine 10 gradually decreases. Thus, the air fuel ratio of the diesel engine 10 can be quickly shifted to the desirable value as of the rich combustion control while suitably inhibiting the fluctuation of the output torque.

(3) The injection quantity is gradually increased in accordance with the estimated oxygen quantity (cylinder inflow oxygen quantity O2cld). Thus, the processing concerning the gradual increase of the quantity of the injected fuel according to the gradual decrease of the oxygen quantity can be performed suitably.

(4) The injection quantity is gradually increased in accordance with the rotation speed of the diesel engine 10 and the operation amount of the accelerator in addition to the cylinder inflow oxygen quantity. Thus, the fluctuation of the output torque can be inhibited more suitably.

(5) The taken fresh air quantity is decreased by changing the opening degree command value of the EGR valve 42 and the target intake quantity Ma stepwise. Thus, the rich combustion period can be shortened as much as possible.

Figure 6:
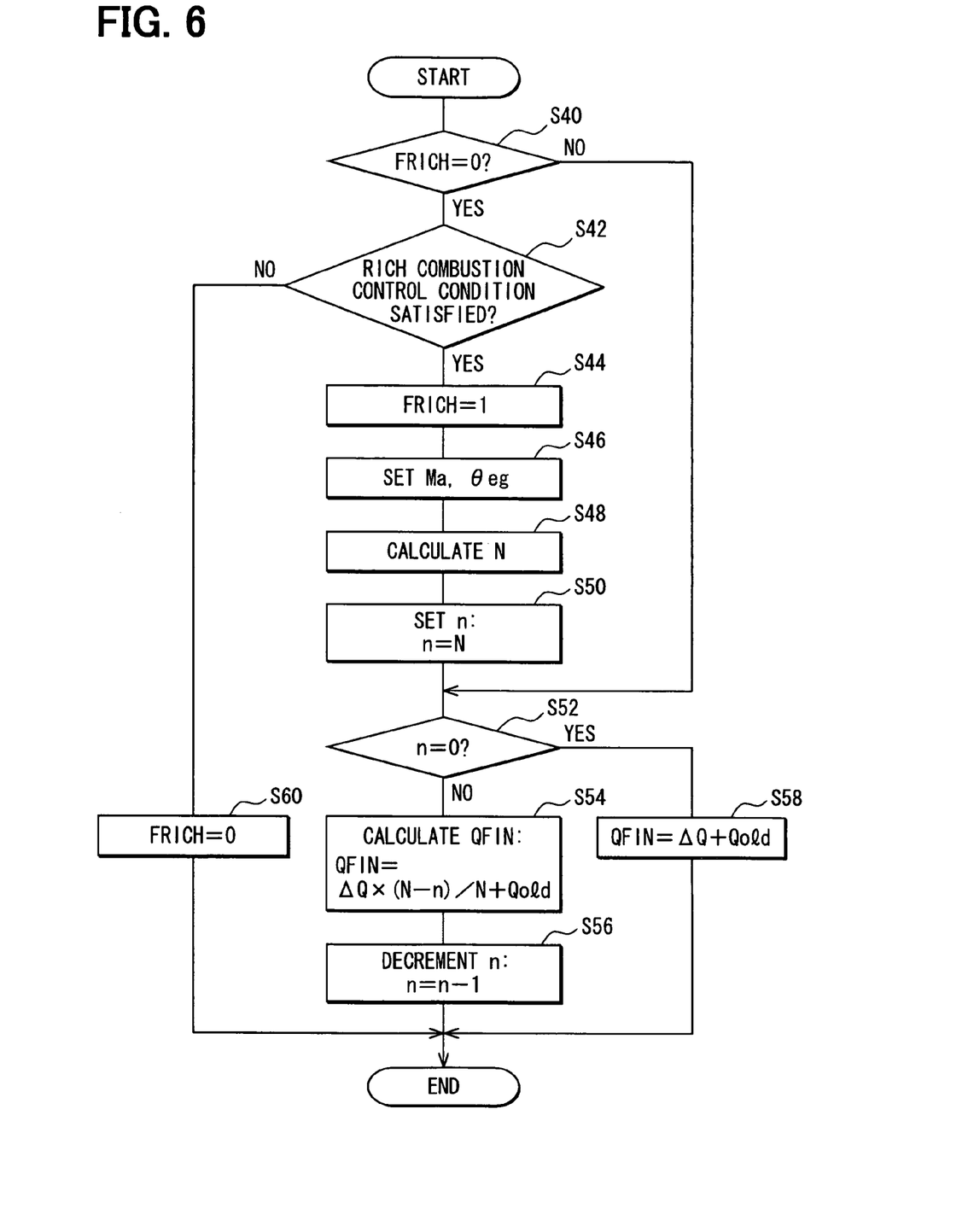
FIG. 6 is a flowchart showing a procedure of rich combustion control processing according to a second embodiment of the present invention.

Next, a second embodiment of the present invention will be described with reference to the drawings, focusing on differences from the first embodiment. FIG. 6 shows a procedure of rich combustion control according to the present embodiment. The ECU 50 repeatedly performs this processing in a predetermined cycle of time, for example.

In a series of the processing, S40 first determines whether a rich combustion control flag FRICH is zero. The rich combustion control flag FRICH is set at 1 while a rich combustion control condition is satisfied and the rich combustion control is performed. The processing shifts to S42 when S40 is YES. The processing shifts to S52 (explained after) when S40 is NO. S42 determines whether the rich combustion control condition is satisfied. This processing is the same as the processing of S20 of FIG. 4. The processing shifts to S44 when S42 is YES. S44 sets the rich combustion control flag FRICH at 1. Following S46 sets a target intake quantity Ma and a command value of an opening degree θeg of an EGR valve. This processing is the same as the processing of S22 of FIG. 4.

Then, S48 performs map calculation of an injection quantity gradual change value N in accordance with the rotation speed NE and the demand torque DT. The injection quantity gradual change value N is a parameter for performing the processing for gradually increasing the injection quantity in accordance with the gradual decrease of the oxygen quantity. The rotation speed NE is used here since the oxygen utilization rate as the rate of the oxygen used for the combustion during the rich combustion depends on the rotation speed NE. Also, the demand torque DT is used to gradually increase the injection quantity while maintaining the demand torque DT. The injection quantity gradual change value N is adjusted beforehand in accordance with the demand torque DT and the rotation speed NE based on the target intake quantity Ma and the EGR valve opening degree θeg decided by processing of S46 as prerequisites.

Following S50 sets an initial value of a counter n to the injection quantity gradual change value N. S52 determines whether the counter n is zero. This processing is for determining whether the gradual increase processing of the injection quantity should be finished. The processing shifts to S54 when S52 is NO. S54 performs processing for gradually increasing the command injection quantity QFIN. That is, the present command injection quantity QFIN is calculated by a following expression (3).

$$QFIN = \Delta Q \times (N-n)/N + Qold \quad (3)$$

In the expression (3), Qold is the injection quantity immediately before the switching to the rich combustion control, i.e., the injection quantity immediately before the rich combustion control flag FRICH is switched to 1. $\Delta Q$ is a value provided by subtracting the value Qold from the injection quantity Qa required when the intake quantity MAF and the EGR quantity Megr reach the steady states during the rich combustion control. Thus, the command injection quantity QFIN increases gradually to the required injection quantity Qa as the counter n is decremented. If the processing of S54 is completed, the processing shifts to S56. S56 decrements the counter n.

The processing shifts to S58 when S52 is YES. S58 sets the command injection quantity QFIN at the required injection quantity Qa. S60 sets the rich combustion control flag at 0 if S42 is NO. If the processing of S56, S58 or S60 is completed, this series of the processing is ended once.

Figure 7:
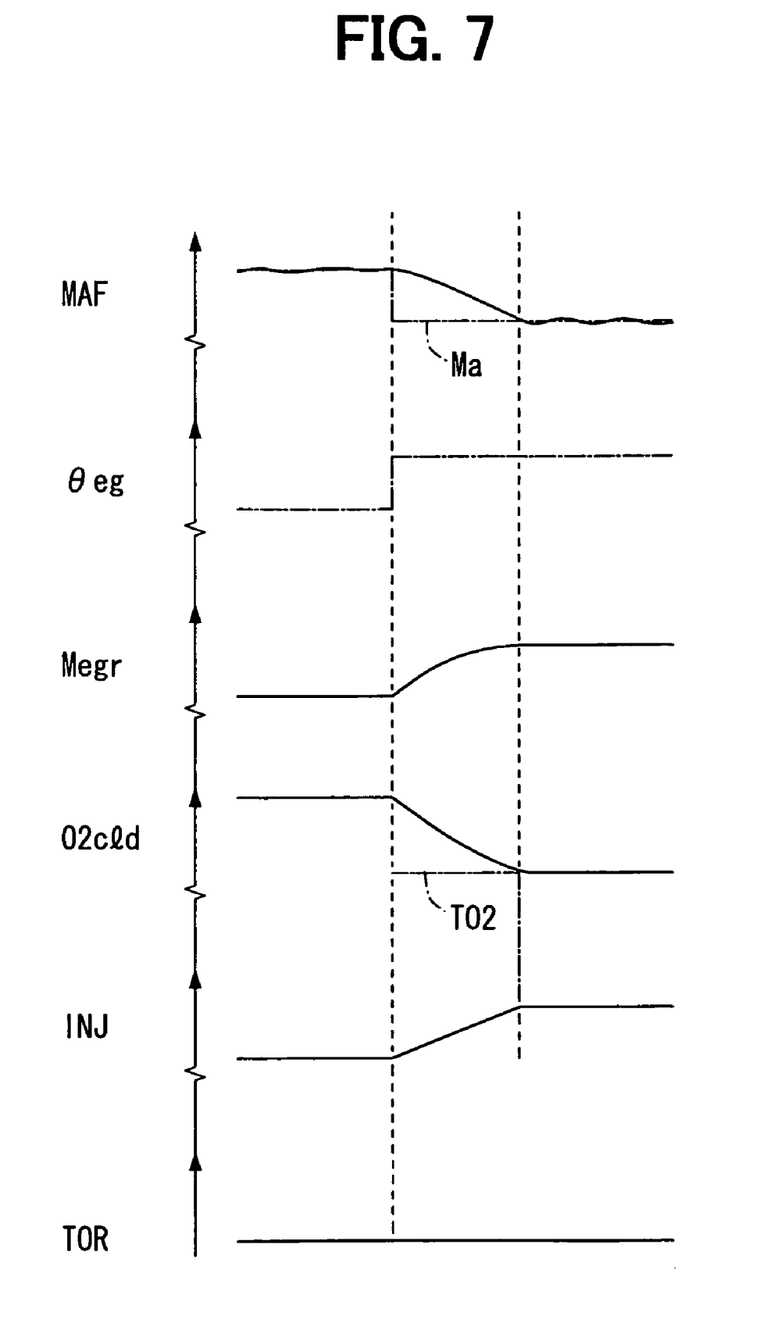
FIG. 7 is a time chart showing a mode of the rich combustion control according to the second embodiment.

FIG. 7 shows a mode of the above-described processing. FIG. 7 corresponds to FIG. 5 except for INJ' and TOR'. The cylinder inflow oxygen quantity is not calculated in the present embodiment. Therefore, O2cld in FIG. 7 shows the oxygen quantity actually flowing into the combustion chamber 26. As shown in FIG. 7, also in the present embodiment, the injection quantity INJ increases gradually in accordance with the gradual decrease of the oxygen quantity O2cld flowing into the combustion chamber 26 to suitably inhibit the fluctuation of the output torque TOR.

The above-described present embodiment exerts a following effect in addition to the effects (1), (5) of the first embodiment.

(6) The gradual increase processing of the injection quantity according to the gradual decrease of the oxygen quantity is performed based on the rotation speed and the demand torque of the diesel engine 10. Thus, the gradual increase processing of the injection quantity can be performed in a mode suitable for generating the required output torque.

The above-described embodiments may be modified as follows, for example.

In the first embodiment, the map calculation of the gradually increasing injection quantity is performed based on the three parameters of the cylinder inflow oxygen quantity, the rotation speed, and the load (operation amount of accelerator). Alternatively, the demand torque may be used as the load. Alternatively, the map calculation of the gradually increasing injection quantity may be performed based on the two parameters of the cylinder inflow oxygen quantity and the rotation speed, for example. When the rotation speed of the diesel engine 10 in the range where the rich combustion control is performed takes a relatively limited value, the output torque fluctuation can be inhibited suitably even if the gradually increasing injection quantity is calculated only in accordance with the cylinder inflow oxygen quantity.

In the first embodiment, the gradual increase processing of the injection quantity is completed when the cylinder inflow oxygen quantity substantially coincides with the target oxygen quantity. Alternatively, a gradual increase processing period may be set and the gradual increase processing may be completed when the period elapses. In this case, map calculation of the gradual increase processing period may be performed using the rotation speed and the demand torque.

In the second embodiment, the injection quantity is increased gradually and linearly. Alternatively, an injection quantity gradual increase curve f(t) may be adjusted in accordance with the parameters such as the rotation speed and the demand torque, and the injection quantity may be increased gradually according to the curve f(t).

The target intake quantity Ma and the opening degree of the EGR valve are changed stepwise to decrease the fresh air quantity taken into the diesel engine 10. Alternatively, the target intake quantity Ma and the EGR valve opening degree may be changed gradually. The target intake quantity Ma and the EGR valve opening degree should be preferably changed as quickly as possible to shorten the rich combustion control period as much as possible.

The target intake quantity Ma is decreased to decrease the fresh air quantity taken into the diesel engine 10. Alternatively, open control of the opening degree of the throttle valve 20 may be performed during the rich combustion control, and the opening degree may be set at the value as of the rich combustion control.

The opening degree of the EGR valve 42 is decreased to the certain opening degree through the open control to decrease the fresh air quantity taken into the diesel engine 10. Alternatively, the EGR valve 42 may be operated to perform the feedback control of the intake air quantity during the rich combustion control.

The method of reducing the fresh air quantity taken into the diesel engine 10 is not limited to the reduction operation of the opening degree of the throttle valve 20 and the increase operation of the opening degree of the EGR valve 42. For example, only either processing may be performed.

The internal combustion engine is not limited to the compression ignition type engine such as the diesel engine but may be a spark ignition type engine such as a gasoline engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection controller that performs fuel injection control of an internal combustion engine by operating an injector of the engine, the engine having an occlusion agent that occludes nitrogen oxides when an air fuel ratio of exhaust gas is lean and discharges the nitrogen oxides when the air fuel ratio is rich, the fuel injection controller comprising:
   a fresh air quantity decrease device that decreases a fresh air quantity taken into an intake system of the engine under a condition requiring the discharge of the nitrogen oxides from the occlusion agent; and
   an injection quantity gradual increase device that gradually increases an injection quantity of the injector in accordance with a gradual decrease of an oxygen quantity flowing into a combustion chamber of the engine when the fresh air quantity is decreased.

2. The fuel injection controller as in claim 1, wherein the injection quantity gradual increase device completes the gradual increase of the injection quantity within a period in which the oxygen quantity flowing into the combustion chamber of the engine gradually decreases.

3. The fuel injection controller as in claim 1, wherein the injection quantity gradual increase device includes an estimation device for estimating the oxygen quantity flowing into the combustion chamber and performs processing for gradually increasing the injection quantity in accordance with the estimated oxygen quantity.

4. The fuel injection controller as in claim 3, wherein the injection quantity gradual increase device performs the processing for gradually increasing the injection quantity further in accordance with rotation speed of the engine.

5. The fuel injection controller as in claim 1, wherein the injection quantity gradual increase device performs processing for gradually increasing the injection quantity according to the gradual decrease of the oxygen quantity based on rotation speed and a load of the engine.

6. The fuel injection controller as in claim 1, wherein the fresh air quantity decrease device performs processing for decreasing the fresh air quantity by stepwise changing at least one of a command value of an operation amount of an actuator that regulates the fresh air quantity of the engine and a target value of the fresh air quantity.

7. A fuel injection control method for controlling fuel injection of an internal combustion engine by operating an injector of the engine, the engine having an occlusion agent that occludes nitrogen oxides when an air fuel ratio of exhaust gas is lean and discharges the nitrogen oxides when the air fuel ratio is rich, the fuel injection control method comprising:
 a fresh air quantity decrease step for decreasing a fresh air quantity taken into an intake system of the engine under a condition requiring the discharge of the nitrogen oxides from the occlusion agent; and
 an injection quantity gradual increase step for gradually increasing an injection quantity of the injector in accordance with a gradual decrease of an oxygen quantity flowing into a combustion chamber of the engine when the fresh air quantity is decreased.

8. The fuel injection control method as in claim 7, wherein the injection quantity gradual increase step completes the gradual increase of the injection quantity within a period in which the oxygen quantity flowing into the combustion chamber of the engine gradually decreases.

9. The fuel injection control method as in claim 7, wherein the injection quantity gradual increase step includes an estimation step for estimating the oxygen quantity flowing into the combustion chamber and performs processing for gradually increasing the injection quantity in accordance with the estimated oxygen quantity.

10. The fuel injection control method as in claim 9, wherein the injection quantity gradual increase step performs the processing for gradually increasing the injection quantity further in accordance with rotation speed of the engine.

11. The fuel injection control method as in claim 7, wherein the injection quantity gradual increase step performs processing for gradually increasing the injection quantity according to the gradual decrease of the oxygen quantity based on rotation speed and a load of the engine.

12. The fuel injection control method as in claim 7, wherein the fresh air quantity decrease step performs processing for decreasing the fresh air quantity by stepwise changing at least one of a command value of an operation amount of an actuator that regulates the fresh air quantity of the engine and a target value of the fresh air quantity.

* * * * *